(12) United States Patent
Trizzino

(10) Patent No.: US 11,076,574 B2
(45) Date of Patent: Aug. 3, 2021

(54) TERRARIUM AND ENCLOSURE INTERNAL VENTILATION AND AIR CIRCULATION SYSTEM

(71) Applicant: Anthony Trizzino, Freehold, NJ (US)

(72) Inventor: Anthony Trizzino, Freehold, NJ (US)

( * ) Notice: Subject to any disclaimer, the term of this patent is extended or adjusted under 35 U.S.C. 154(b) by 190 days.

(21) Appl. No.: 16/374,807

(22) Filed: Apr. 4, 2019

(65) Prior Publication Data
US 2020/0315122 A1    Oct. 8, 2020

(51) Int. Cl.
*A01K 1/00* (2006.01)
*A01K 63/00* (2017.01)

(52) U.S. Cl.
CPC .......... *A01K 1/0052* (2013.01); *A01K 63/006* (2013.01)

(58) Field of Classification Search
CPC .. A01K 1/0052; A01K 63/006; A01K 1/0047; A01K 1/0058; A01K 1/0064; A01K 1/0076
USPC .................................................. 119/500, 418
See application file for complete search history.

(56) References Cited

U.S. PATENT DOCUMENTS

| | | | | |
|---|---|---|---|---|
| 5,261,352 A | * | 11/1993 | Stammelman | A01K 63/006 119/28.5 |
| 5,799,614 A | * | 9/1998 | Greenwood | A01K 63/065 119/452 |
| 9,044,101 B2 | * | 6/2015 | Garcia | A47C 21/048 |
| 2010/0180830 A1 | * | 7/2010 | Fritter | A01K 1/0107 119/500 |
| 2010/0319627 A1 | * | 12/2010 | Cauchy | F24F 5/0042 119/500 |

* cited by examiner

*Primary Examiner* — Justin M Jonaitis

(57) ABSTRACT

The device is a hollow enclosure, similar to a hollow tube shape with openings on either end. The openings are covered by a fine screen, to allow air to pass through the center of the device. Further, a small fan is installed in the center of the device, allowing to suck air in from one side, and blow air out of the other side. The device is then placed into a terrarium, vivarium, or similar pet or plant cage to create internal air circulation within the environment.

1 Claim, 3 Drawing Sheets

TERRARIUM AND ENCLOSURE INTERNAL VENTILATION AND AIR CIRCULATION SYSTEM

BACKGROUND OF THE INVENTION

The field of invention relates to animal and plant cage enclosures. This is a device that contains a fan that can be placed in a terrarium, or similar cage, to mechanically introduce airflow into a normally stagnant environment.

BRIEF SUMMARY OF THE INVENTION

To allow a person to have the ability to increase airflow within pet cages, such as terrariums, vivariums, and other types of containers. This is done by circulating existing air within the environment, without introducing outside air into the environment. This allows enclosed air to remain healthy, mold free, and maintain even temperatures and humidity. Outside circulated air risks temperature change and humidity change, which can be devastating to the health of animal and plant species requiring specific environments.

DETAILED DESCRIPTION OF THE INVENTION

Figure 1:
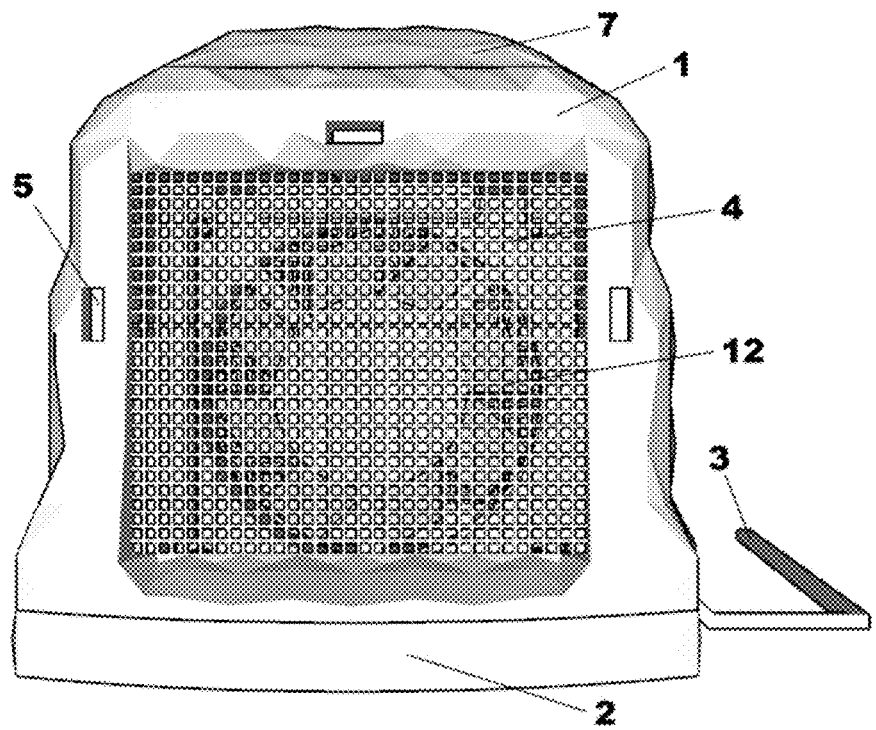
FIG. 1 shows the front of the device, fully assembled as a rock shape, with a hollow inside containing a screen 4 on either side, with a fan 12 seen through the screen 4 in the mid section 7. 1 is the front cover piece. 2 is the bottom of the device, which attaches to the front and back cover pieces, as well as the hollow mid section 7. 3 is the power cable that extends out from the right side of the device. 5 these holes are simply openings to allow the injection mold to release itself from the clips on the other side, shown in FIG. 6.
Figure 2:
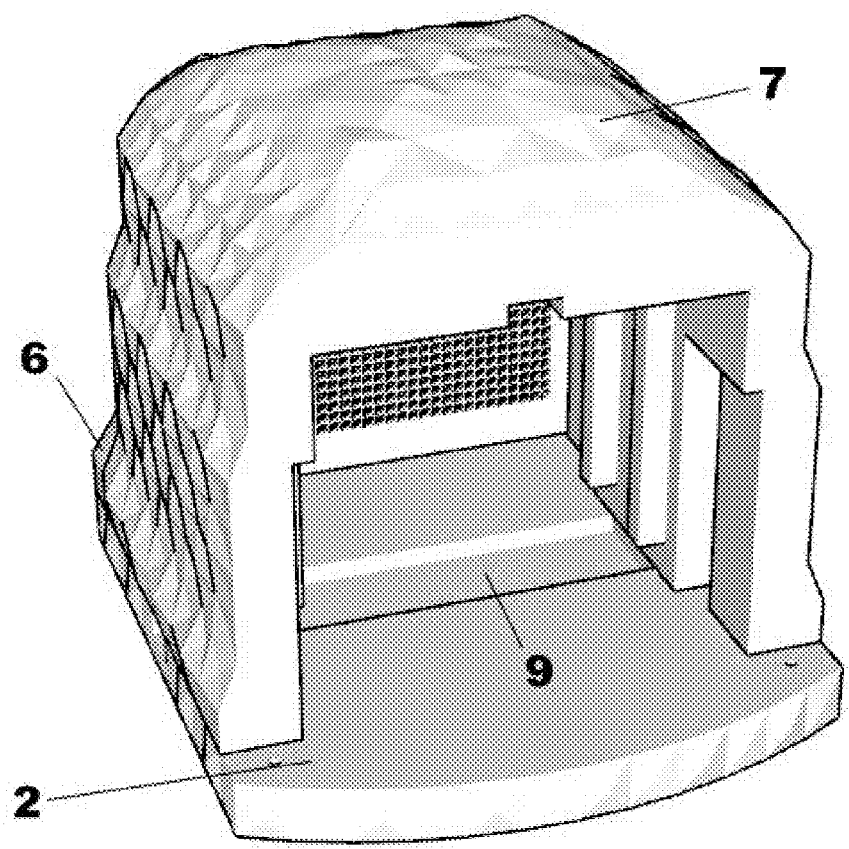
FIG. 2 Shows an angled view of the front of the device, with the front cover, screen, and fan removed. This view is exposing part 9, contained on the bottom 2 of the device where the fan sits inside the hollow rock shape structure. Also shown, is the hollow mid section 7, and the back cover 6.
Figure 3:
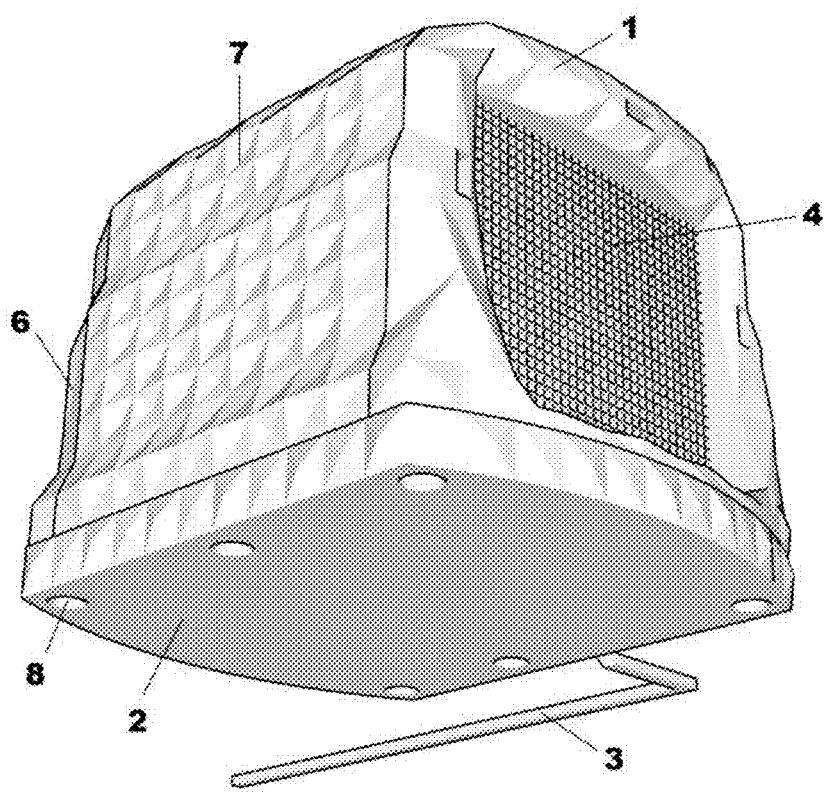
FIG. 3 displays the device at an angle view from the bottom left side of the front. This shows the front 1 piece with screen 4, as well as the back piece 6, and how the bottom 2 aligns on all three sections 1,6,7 as described in FIG. 1. Shown are the pilot holes 8 for screws to attach the bottom to the rest of the structure.
Figure 4:
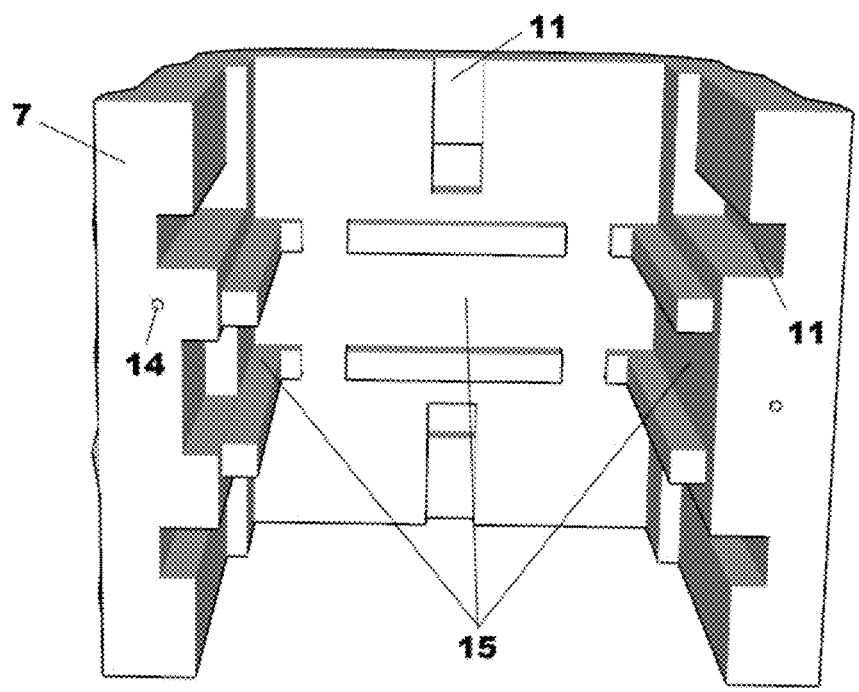
FIG. 4 displays a sectional bottom view of only the mid section 7 of the device. Front, back and bottom pieces, including the fan and power cable have been removed to expose the inner part of the mid section that holds the fan in place 15. Shown as 11, are tracks for the clips of front and back cover pieces to snap into, with clips shown in FIG. 6. Also shown are pilot holes 14 for screws that transfer through the bottom piece, into the mid section 7.
Figure 5:
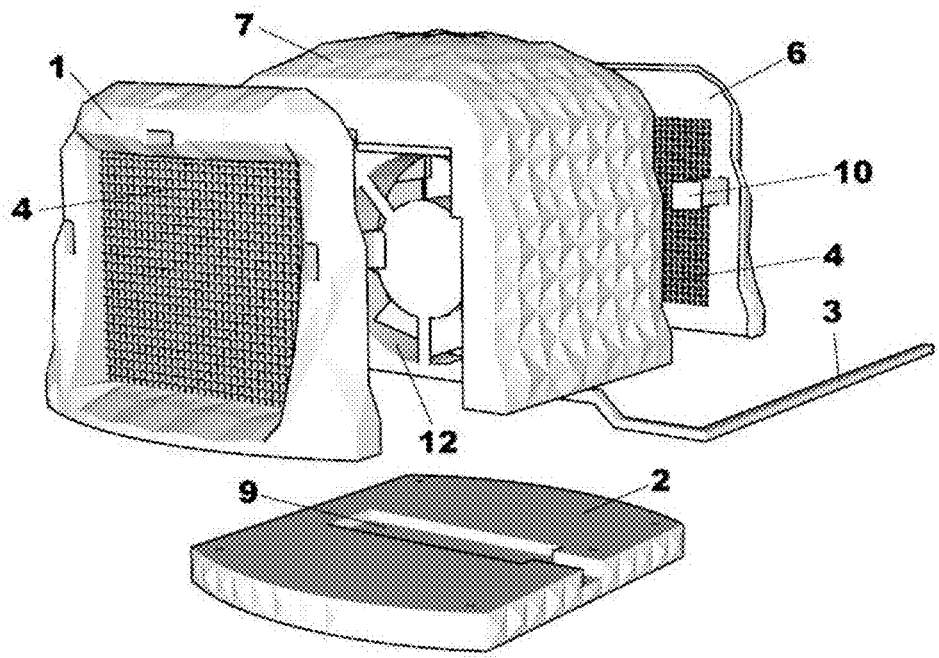
FIG. 5 shows an exploded view of all components, front 1 with screen 4, back 6 with screen 4, bottom 2, mid section 7, and fan 12. 9 shows the resting place for the fan 12 in the bottom of the device, which is powered with the external power cable 3. 10 shows the clips to attach front 1 to mid section 7 and back 6 to mid section 7.
Figure 6:
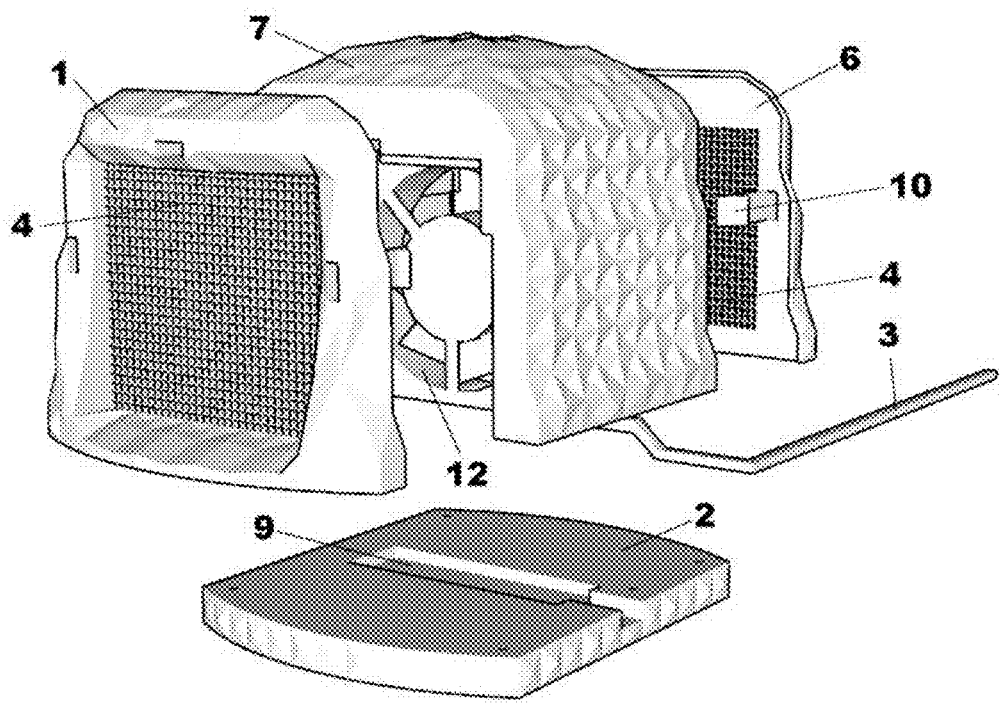
FIG. 6 shows an exploded view of the device excluding the fan mechanism, to show internal structure. 15 shows where the fan mechanism will slide into the mid section 7 as described in FIG. 4. 10 shows the clips that will snap the front 1, and back 6, into the mid section in track 11. The bottom 2, is then screwed into all components from the bottom holes 8 holding the structure together.

The purpose of the device is to introduce airflow into pet cages that normally contain little to no airflow. The need for airflow in pet cages is needed, especially within terrariums that contain plants, water, high humidity, and usually a sealed environment. The need for airflow is also necessary in cages that do not contain high humidity, such as a desert terrarium, in order to be able to control the cage from getting excessively, or unevenly heated.

Without airflow, pet cages get stagnant, grow mold, and cause unsafe conditions for pets and their owners. Introduction of outside airflow, effects humidity levels, temperatures, and other important environment specifications that are crucial to the survival of certain species of animals and plants. The current solution to this problem is to open covers and allow the cages to air out every once in a while, which creates an uncontrolled, unstable environment for environmentally sensitive organisms. Also, harmful chemicals can be introduced to control mold, but will likely harm plants.

The device solves all these issues, and since it is designed to appear as a rock or stump, it looks like part of the cage, not taking away from the desired appearance, and giving much needed ventilation to the environment. With the increased inside airflow, mold growth cannot occur, and by circulating internal air, humidity will not be lost, nor will temperature change. Temperature and humidity will in turn be evenly distributed throughout the environment.

The device will be provided completely assembled, with a fan inside. The front and back pieces of the device that connect to the mid section are covered with a fine, non-metal screen, to avoid pets and other critters from entering the hollow cavity of the device. The fan contained inside the device is treated and rated for high humidity environments, to avoid becoming rusty and causing malfunctions. Any metal parts of the device, including screws are rust proof, outdoor rated galvanized metal only.

The device is designed in such a way that it can be made using injection mold methods, made from plastic materials. It would then be painted and colored accordingly. All pieces of the design are made to snap together, excluding the final assembly piece, the bottom, which is screwed onto the rest of the assembled device. This is designed in this way to give access to the fan when needed, for possible replacement, or cleaning.

The device will come in several sizes, ranging from 40 mm-80 mm. They will be marketed as Small, Medium, and Large, with the possible additions of sizes during production. All sizes and designs operate the same way, and are designed for the same purpose, with just color change, outside appearance, and adjustments to scale of the size. Different variations may include the same device, but with a beveled down top to act as a food dish, or a place to hold dirt for planting, for example. Different designs can be made to look like nature items, such as dirt mounds, rocks, and tree stumps. Because of the variation of these structure designs, it should be noted that descriptions and drawings should refer only to the purpose of the device, and the illustrated version is for examples only. Any modifications and alterations, which are intended to be a part of this device disclosure, will fall under the scope of the invention.

The invention claimed is:

1. A safe internally ventilating apparatus for a terrarium, a vivarium, or a container comprising:
    a housing comprising of a front piece, a hollow midsection, and a back piece, said hollow midsection including a plurality of tracks;
    said front piece and said back piece of a plurality of clips to connect to the tracks to secure the front piece and the back piece to the hollow midsection,
    said front piece comprising a forward screen and said back piece comprising a rear screen;
    an electric powered fan located within the hollow midsection, said fan rotating to produce an airflow;
    a base portion which includes a fan resting portion and a cable guide for the electric powered fan, said base portion connected to the housing to form a passageway covered by the front and rear screens such that the airflow created by said electric powered fan flows from the back piece through the front piece however an animal is prevented from entering said passageway;
    wherein the combination of the base portion and the housing creates an external surface having an exterior shape, said external surface being textured to resemble an ornamental rock;
    said apparatus being placed entirely within a volume of the terrarium, vivarium, or container to create air circulation within the volume by way of the airflow generated by said electric powered fan.

* * * * *